US 12,524,866 B2

(12) United States Patent
Hyatt et al.

(10) Patent No.: US 12,524,866 B2
(45) Date of Patent: Jan. 13, 2026

(54) OPTIMIZING A SET-UP STAGE IN AN AUTOMATIC VISUAL INSPECTION PROCESS

(71) Applicant: Siemens Aktiengesellschaft, Munich (DE)

(72) Inventors: Yonatan Hyatt, Tel-Aviv (IL); Dan Carmon, Modiin (IL)

(73) Assignee: Siemens Aktiengesellschaft, Munich (DE)

( * ) Notice: Subject to any disclaimer, the term of this patent is extended or adjusted under 35 U.S.C. 154(b) by 761 days.

(21) Appl. No.: 17/294,752

(22) PCT Filed: Nov. 18, 2019

(86) PCT No.: PCT/IL2019/051260
§ 371 (c)(1),
(2) Date: May 18, 2021

(87) PCT Pub. No.: WO2020/100146
PCT Pub. Date: May 22, 2020

(65) Prior Publication Data
US 2022/0020136 A1    Jan. 20, 2022

Related U.S. Application Data

(60) Provisional application No. 62/768,934, filed on Nov. 18, 2018.

(30) Foreign Application Priority Data

Nov. 18, 2018 (IL) .......................................... 263097

(51) Int. Cl.
G06T 7/00     (2017.01)
G06F 18/23    (2023.01)
G06T 7/73     (2017.01)

(52) U.S. Cl.
CPC .............. *G06T 7/001* (2013.01); *G06F 18/23* (2023.01); *G06T 7/74* (2017.01); *G06T 2207/30164* (2013.01)

(58) Field of Classification Search
CPC . G06T 7/001; G06T 7/74; G06T 2207/30164; G06T 2207/10004;
(Continued)

(56) References Cited

U.S. PATENT DOCUMENTS 5,850,466 A    12/1998  Schott
6,999,614 B1    2/2006  Bakker et al.
(Continued)

FOREIGN PATENT DOCUMENTS

CN    102196721    9/2011
CN    103196914    7/2013
(Continued)

OTHER PUBLICATIONS

Extended European Search Report in EP19885049.7, Apr. 12, 2022, European Patent Office, Munich, DE.
(Continued)

*Primary Examiner* — Samir A Ahmed
(74) *Attorney, Agent, or Firm* — Cozen O'Connor

(57) ABSTRACT

Embodiments of the invention provide a system and method for a visual inspection process, in which images of objects on an inspection line are automatically grouped into clusters based on the appearance of the object in the images. The clustered images create a broad database of images that can be used as a reference for inspected items having different appearances, which ensures that all parts and appearances of an inspected object can be identified and inspected, thereby increasing the success of defect detection and substantially minimizing false detection of defects.

13 Claims, 9 Drawing Sheets

(58) Field of Classification Search
CPC . G06T 2207/20092; G06T 2207/20216; G06T 2207/30108; G06T 7/0004; G06F 18/23; G06F 1/00; G01N 21/8851; G01N 21/9515; G01N 2021/888; G01N 2021/8887

See application file for complete search history.

(56) References Cited

U.S. PATENT DOCUMENTS

| | | |
|---|---|---|
| 7,369,236 B1 | 5/2008 | Sali et al. |
| 8,295,580 B2 | 10/2012 | Kuan |
| 9,224,070 B1 | 12/2015 | Sundareswara |
| 2003/0182251 A1 | 9/2003 | Kim |
| 2004/0156540 A1 | 8/2004 | Gao et al. |
| 2010/0215246 A1 | 8/2010 | Albeck |
| 2011/0052040 A1 | 3/2011 | Kuan |
| 2011/0218754 A1 | 9/2011 | Mori |
| 2012/0128230 A1 | 5/2012 | Meada |
| 2012/0154607 A1 | 6/2012 | Moed |
| 2012/0155741 A1 | 6/2012 | Shibuya |
| 2013/0170734 A1* | 7/2013 | Uchiyama ............ G06T 7/0004 382/149 |
| 2013/0177232 A1 | 7/2013 | Hirano |
| 2015/0022654 A1 | 1/2015 | Greenberg et al. |
| 2015/0064813 A1 | 3/2015 | Ayotte |
| 2015/0131116 A1 | 5/2015 | Sochi |
| 2015/0243010 A1 | 8/2015 | Kaneko |
| 2015/0362908 A1 | 12/2015 | Lee |
| 2017/0154234 A1 | 6/2017 | Tanaka et al. |
| 2019/0206047 A1* | 7/2019 | Honda ............... G01N 21/8851 |
| 2019/0311224 A1* | 10/2019 | Krishnan ............ G06V 10/763 |
| 2021/0390676 A1* | 12/2021 | Floeder ................... G06T 3/60 |

FOREIGN PATENT DOCUMENTS

| | | | |
|---|---|---|---|
| CN | 106934794 | 7/2017 | |
| JP | 2005-274157 | 10/2005 | |
| JP | 2011076204 | 4/2011 | |
| JP | 2011232302 | 11/2011 | |
| JP | 2013224833 | 10/2013 | |
| JP | 2014025763 | 2/2014 | |
| JP | 2015179073 | 10/2015 | |
| JP | 2018004393 | 11/2018 | |
| KR | 101688458 B1 | 12/2016 | |
| TW | 201118370 | 6/2011 | |
| WO | WO-02088688 A1 * | 11/2002 | ....... G01N 21/95607 |
| WO | WO 2019130307 A1 * | 7/2019 | |
| WO | WO 2019215746 A1 * | 11/2019 | |

OTHER PUBLICATIONS

Je-Kang Park, et al., "Machine Learning-Based Imaging System for Surface Defect Inspection", International Journal of Precision Engineering and Manufacturing-Green Technology, Jul. 2016, vol. 3, No. 3, pp. 303-310.

* cited by examiner

OPTIMIZING A SET-UP STAGE IN AN AUTOMATIC VISUAL INSPECTION PROCESS

CROSS-REFERENCE TO RELATED APPLICATIONS

This is a U.S. national stage of application No. PCT/IL2019/051260 filed 18 Dec. 2019. Priority is claimed on Provisional Application No. 62/768,934 filed 18 Nov. 2018, and Israeli Application No. 263097 filed 18 Nov. 2018, the contents of which are incorporated herein by reference in their entirety.--

FIELD

The present invention relates to automated visual inspection processes, for example, inspection of items during a production process.

BACKGROUND

Inspection during production processes can be instrumental in ensuring the quality of the production. For example, inspection during production processes at manufacturing plants helps control the quality of products by identifying defects and then acting upon this identification, for example, by fixing the defect or discarding the defective part. During production, the process of defect detection is essential for quality assurance (QA), gating and sorting on production lines, and is consequently useful in improving productivity, improving production processes and working procedures, reducing defect rates, and reducing re-work and waste.

Visual inspection methods are used in production lines to identify visually detectable anomalies that may have a functional or esthetical impact on the integrity of a manufactured item. Existing visual inspection solutions for production lines rely on custom made automated visual inspection systems, which are typically highly expensive and require expert integration of hardware and software components, as well as expert involvement in setting the surroundings, the camera-system apparatus, imaging parameters and software and algorithms.

Existing automatic visual inspection solutions are typically constrained to a specific item and the specific imaging environment for which the solution was set-up. Even solutions based on visual machine learning techniques, heavily rely on user input to identify the object being inspected and any change in the object or in the position of the object on the inspection line or the surrounding illumination, requires manual adjustment of the system.

Additionally, inspected objects' appearance can be highly variable, due to even small changes in the imaging environment and the physical location and position of the imaged object on the inspection line. Depending on the 3D shape of the object and movement of the object in the different images, different images will show perspective distortion and occlusions of the object from one image to the other. This variability greatly affects the visual representation of imaged objects, often causing false identification of objects and false detection of defects, requiring frequent and laborious involvement of a human inspector in the inspection process.

SUMMARY

Embodiments of the invention provide a system and method for a visual inspection process, in which images of objects on an inspection line are automatically grouped into clusters based on the appearance of the object in the images. The clustered images create a broad database of images that can be used as a reference for inspected items having different appearances. A broad database of references ensures that all parts and appearances of an inspected object can be identified and inspected, thereby increasing the success of defect detection and substantially minimizing false detection of defects.

Additionally, embodiments of the invention enable presenting a large amount of inspected items for user confirmation prior to beginning the inspection stage, thereby efficiently utilizing the user's time and streamlining the inspection process.

In one embodiment a visual inspection system and method include detecting an object in a plurality of set-up images of an inspection line and grouping the images into clusters according to values of a criterion of the imaged object. The object is then detected in an inspection image of the inspection line and the inspection image is compared to one of the clusters according to the value of the criterion of the object in the inspection image. A defect can thus be detected on the object in the inspection image based on the comparison.

Once clusters are created for practically all possible appearances of the reference images, the inspection stage may commence with a much reduced risk of incorrect detection, thereby providing an improved inspection process.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1A:
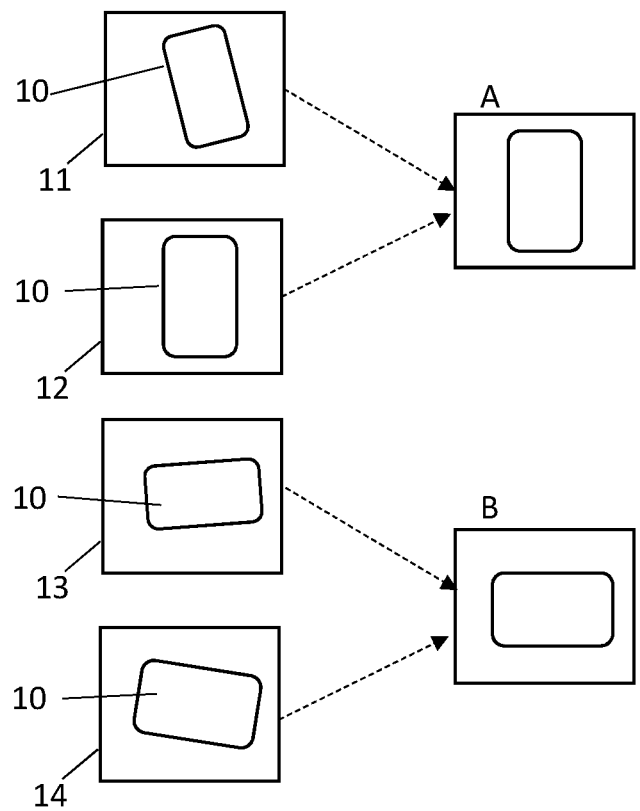
FIG. 1A schematically illustrates a set-up stage of a visual inspection process, according to an embodiment of the invention.

An inspection line process may include a set up stage prior to an inspection stage. In one embodiment, in the set up stage, samples of a manufactured item with no defects (defect-free items) are imaged on an inspection line. The images (which may also be referred to as set up images and/or reference images) are analyzed by a processor and are then used as reference images for image processing and inspection algorithms (e.g., defect detection algorithms) run at the inspection stage. Embodiments of the invention enable using also samples that are not necessarily defect-free, during the set-up stage, as further explained below.

In the inspection stage, inspected items (manufactured items that are to be analyzed for inspection tasks, e.g., defect detection, sorting and/or counting) are imaged to produce inspection images, and inspection tasks can be performed on the inspected items based on analysis of the set up images and inspection images.

In the set up stage, a processor learns spatial properties and uniquely representing features or attributes of a defect-free item in images, as well as optimal parameters of images of defect-free items, for example, optimal imaging parameters (e.g., exposure time, focus and illumination). These properties may be learned, for example, by analyzing images of a defect-free item using different imaging parameters and by analyzing the relation between different images of a same type of defect-free item. This analysis during the set up stage enables to discriminatively detect a same type of item (either defect free or with a defect) in a new image, regardless of the imaging environment of the new image, and enables to continually optimize the imaging parameters with minimal processing time during the following inspection stage.

In one embodiment, the analysis of the set up images is used to determine a spatial range in which the defect free item shows no perspective distortion. The level of perspective distortion between items in different images can be analyzed, for example, by detecting regions in an item which do not have corresponding features between the set up images, by analyzing the intersection location and angles between the item's borders or marked areas of interest on the item, etc. The borders of the spatial range may be calculated by comparing two (or more) set up images (in which items may be positioned and/or oriented differently) and determining which of the images show perspective distortion and which do not.

The calculated range can then be used to determine the borders of where and/or in which orientation, scale or other dispositioning, an inspected item may be placed on the inspection line so as to avoid distortion. Additionally, by using a set of set up images as references for each other, the processor can detect images having similar spatial decomposition and this set of images can then be analyzed to see if there are enough similar set up images to allow registration, defect-detection and other analyses for each possible position/location on the inspection line.

"Enough set up images" are collected when an essentially complete representation of a type of item is achieved. For example, when enough images are collected to enable determining the spatial range in which each reference image can be used as a distortion-less reference, as described above, or when comparing the setup images to each other no new tolerances or surface variations are discovered as new setup images are added. Analysis of the set up images may be performed to collect information regarding possible 2D shapes and 3D characteristics (e.g., rotations on the inspection line) of an item or to find uniquely discriminative features of the item and the spatial relation between these unique features, as preserved between the set up images.

Based on the information collected from set up images a processor can detect a second item of the same type and perform inspection tasks, even if the second item was not previously learned by the processor. This allows the processor to detect when a new item (of the same type) is imaged, and then to analyze the new item, for example, to search for a defect on an inspected item, based on the analysis of set up images. Analyzing a new item typically includes applying inspection algorithms, e.g., defect detection algorithms, which, in one embodiment, include detecting the item in the image and comparing image data of the detected item to image data of reference images.

In some cases reference images may show a low level of registration quality or may not enable registration at all. In other cases reference images may show low probability of object detection or no object detection. In yet other cases reference images may show low correlation when compared to each other and/or objects or marked regions of interest within the images may show low correlation when compared to each other. These cases may indicate that the objects in these images are too different for comparison. However, since these images are obtained during the set-up stage, which is typically closely overseen by a user, these images indicate a real-life situation on the inspection line and similar images will probably be obtained during the inspection stage, which is less closely overseen by a user. Yet, if reference images have a low probability of object detection or defect detection, an inspection image compared to these reference images will not be correctly analyzed and there is a risk of not detecting an object in an inspection image and/or not detecting a defect on the inspection image or falsely detecting a defect on the inspection image.

Embodiments of the invention alleviate this risk by ensuring that all reference images are grouped to a cluster in which there are enough other similar reference images ensuring that comparison, registration and other analysis of the reference images in the cluster can be performed and ensuring that there will be a reference group for all inspection images, even if the objects in the inspection images have different visual appearances.

Appearance (or visual appearance) of an object may include any feature visible to a camera. For example, appearance may include spatial features of the object in the image (e.g., positioning and/or rotation of the object or parts of the object within the field of view (FOV) of the camera, shape and/or size of the object, visible patterns or markings on the object, etc.).

Once clusters are created for practically all possible appearances of the reference images, the inspection stage may commence with a much reduced risk of incorrect detection, thereby providing an improved inspection process.

According to embodiments of the invention a large amount of reference images can be automatically grouped in different clusters based on differences in visual appearance of the object being imaged, thereby creating a large enough reference for substantially each and every different appearance of an inspected object. This greatly improves identification of an inspection object and detection of defects on the object.

The terms "item" and "object" may be used interchangeably and are meant to describe the same thing.

In some embodiments the different clusters may be presented in a compressed way to a user (such as an operator of an inspection line) to obtain user confirmation prior to beginning the inspection stage, thereby enabling a time-efficient and streamlined inspection process.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "creating", "producing", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

Figure 1B:
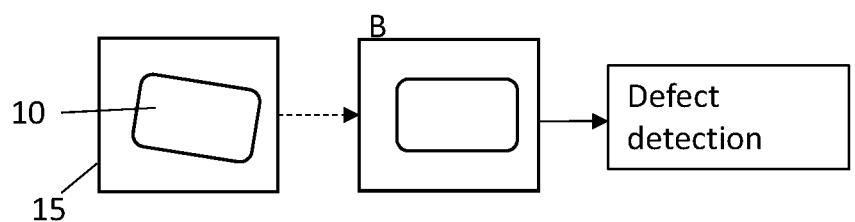
FIG. 1B schematically illustrates an inspection stage of a visual inspection process, according to an embodiment of the invention.

In one embodiment a visual inspection method includes a set-up stage, an example of which is schematically illustrated in FIG. 1A, and an inspection stage, an example of which is schematically illustrated in FIG. 1B. In one embodiment, set-up images (obtained during the set up stage) include images of defect-free objects and inspection images (obtained during the inspection stage) include either a defect-free or defected objects.

In the set up stage, an object 10 is detected in a number of set-up images 11, 12, 13 and 14 of an inspection line. In each set-up image the object 10 conforms to a criterion.

A criterion may include, for example, a spatial feature of the object 10 in the image, e.g., a position or angle of placement of the object within the image (such as its position relative to the camera FOV, its rotation in three axes relative to the camera FOV, its shape or scale relative to the camera FOV, etc.). Another example of a criterion includes one or more visual features, such as, visible marks on the object. Other properties of the objects and/or images may be used as criteria.

The images 11, 12, 13 and 14 are grouped into clusters (e.g., cluster A and cluster B) according to values of the criterion. In the example illustrated in FIG. 1A, the criterion for grouping the images is positioning of the object 10. Images 11 and 12, in which the object 10 is positioned similarly, i.e., can be defined by similar angle values, are both assigned to cluster A, whereas images 13 and 14, in which object 10 is positioned similarly to each other but differently from the positioning of object 10 in images 11 and 12, are assigned to cluster B.

In the following inspection stage (FIG. 1B) an inspection image is compared to a cluster of set up images based on the value of the criterion of the object in the inspection image. For example, object 10 is detected in an inspection image 15. The positioning of the object 10 in inspection image 15 (e.g., the angle of object 10 in relation to a point within the image) is similar to the positioning of the object in the set up images assigned to cluster B (e.g., all these images include objects having similar angle values). Therefore, the images in cluster B can be used as an appropriate reference for the object in inspection image 15, ensuring that there are reference images similar enough to inspection image 15 so that they can be used as a reference for detecting the object 10 and/or detecting defects on the object 10 in the inspection image 15.

Thus, the inspection image 15 is compared to the images assigned to cluster B in order to detect a defect on object 10 based on the comparison.

Object 10 in each of the images 11, 12, 13, 14 and 15 is a different item however, all objects 10 are same-type objects.

The term "same-type items" or "same-type objects" refers to items or objects which are of the same physical makeup and are similar to each other in shape and dimensions and possibly color and other physical features. Typically, items of a single production series, batch of same-type items or batch of items in the same stage in its production line, may be "same-type items". For example, if the inspected items are sanitary products, different sink bowls of the same batch are same-type items.

A defect may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, and an incorrect alignment of the item or parts of the item, a wrong or defected barcode, and in general, any difference between the defect-free sample and the inspected item, which would be evident from the images to a user, namely, a human inspector. In some embodiments a defect may include flaws which are visible only in enlarged or high resolution images, e.g., images obtained by microscopes or other specialized cameras.

Figure 2:
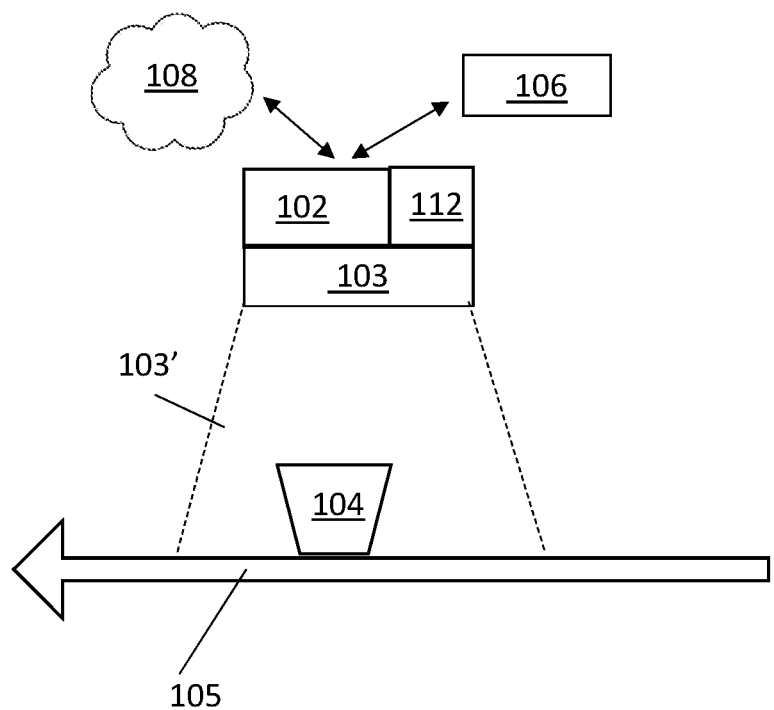
FIG. 2 is a schematic illustration of a system for visual inspection, according to an embodiment of the invention.

Methods according to embodiments of the invention may be performed by a system for visual inspection, an example of which is schematically illustrated in FIG. 2.

An exemplary system which may be used for automated visual inspection of an item on an inspection line, includes a processor 102 in communication with one or more camera (s) 103 and with a device, such as a user interface device 106 and/or other devices, such as storage device 108.

Components of the system may be in wired or wireless communication and may include suitable ports and/or network hubs. In some embodiments processor 102 may communicate with a device, such as storage device 108 and/or user interface device 106 via a controller, such as a programmable logic controller (PLC), typically used in manufacturing processes, e.g., for data handling, storage, processing power, and communication capabilities. A controller may be in communication with processor 102, storage device 108, user interface device 106 and/or other components of the system, via USB, Ethernet, appropriate cabling, etc.

Processor 102 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 102 may be locally embedded or remote.

The user interface device 106 may include a display, such as a monitor or screen, for displaying images, instructions and/or notifications to a user (e.g., via text or other content displayed on the monitor). User interface device 106 may also be designed to receive input from a user. For example, user interface device 106 may include a monitor and keyboard and/or mouse and/or touch screen, to enable a user to input feedback.

Storage device 108 may be a server including for example, volatile and/or non-volatile storage media, such as a hard disk drive (HDD) or solid-state drive (SSD). Storage device 108 may be connected locally or remotely, e.g., in the cloud. In some embodiments storage device 108 may include software to receive and manage image data related to reference images and/or inspection images.

Camera(s) 103, which are configured to obtain an image of an inspection line 105, are typically placed in relation to the inspection line 105 (e.g., a conveyer belt), such that items (e.g., item 104) placed on the inspection line 105 are within the FOV 103' of the camera 103.

Camera 103 may include a CCD or CMOS or other appropriate chip. The camera 103 may be a 2D or 3D camera. In some embodiments the camera 103 may include a standard camera provided, for example, with mobile devices such as smart-phones or tablets. In other embodiments the camera 103 is a specialized camera, e.g., a camera for obtaining high resolution images.

The system may also include a light source, such as an LED or other appropriate light source, to illuminate the camera FOV 103', e.g., to illuminate item 104 on the inspection line 105.

Processor 102 receives image data (which may include data such as pixel values that represent the intensity of reflected light as well as partial or full images or videos) of objects on the inspection line 105 from the one or more camera(s) 103 and runs processes according to embodiments of the invention.

Processor 102 is typically in communication with a memory unit 112. Memory unit 112 may store at least part of the image data received from camera(s) 103.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 112 stores executable instructions that, when executed by processor 102, facilitate performance of operations of processor 102, as described herein.

In one embodiment processor 102 applies computer vision and image processing techniques and algorithms (e.g., as described above) to determine a visual appearance of an object in images and to assign images to one of a plurality of groups or clusters based on a criterion related to the visual appearance of the object.

In one embodiment processor 102 receives images (e.g., set-up images) of an object and groups the images into a cluster based on appearance of the object in each image. When a successive image is received (e.g., an inspection image obtained after the set-up images were obtained) it is assigned to a cluster and compared at least to the set up images grouped to the cluster. This ensures a group of images of objects of the same type which are comparable to the current inspection image without degraded results to the perspective distortion. Defects on the object in the in the successive image can then be detected based on the comparison. In some embodiments processor 102 causes the detected defects to be displayed (e.g., via user interface device 106), e.g., for a user's approval.

In some embodiments the clusters (typically, image data related to each cluster) are stored in a reference image database (which may be maintained, for example, in storage device 108), which is later used for defect detection in inspection images. In some embodiments image data is maintained within the database such that reference images are linked to a cluster based on one or more criterion. For example, referring to FIG. 1A, set-up images 11 and 12 may be stored in the reference image database with a link to the criterion defining cluster A (e.g., position, which can be expressed as a value of an angle or range of angles) and set-up images 13 and 14 may be stored in the reference image database with a link to the criterion defining cluster B.

In the inspection stage, a criterion (and typically, the value of the criterion) of an inspection image (e.g., inspection image 15) is determined, e.g., by processor 102. In the example illustrated in FIGS. 1A and 1B, the criterion is position and the value may be, for example, the angle of rotation relative to a point in the image. Based on the determined criterion and/or value of criterion, the appropriate cluster of reference images may be easily identified and used as reference for the inspection image. The appropriate cluster of reference images, in this case, would be the cluster defined by the same or similar criterion and/or value of the inspection image.

Figure 1C:
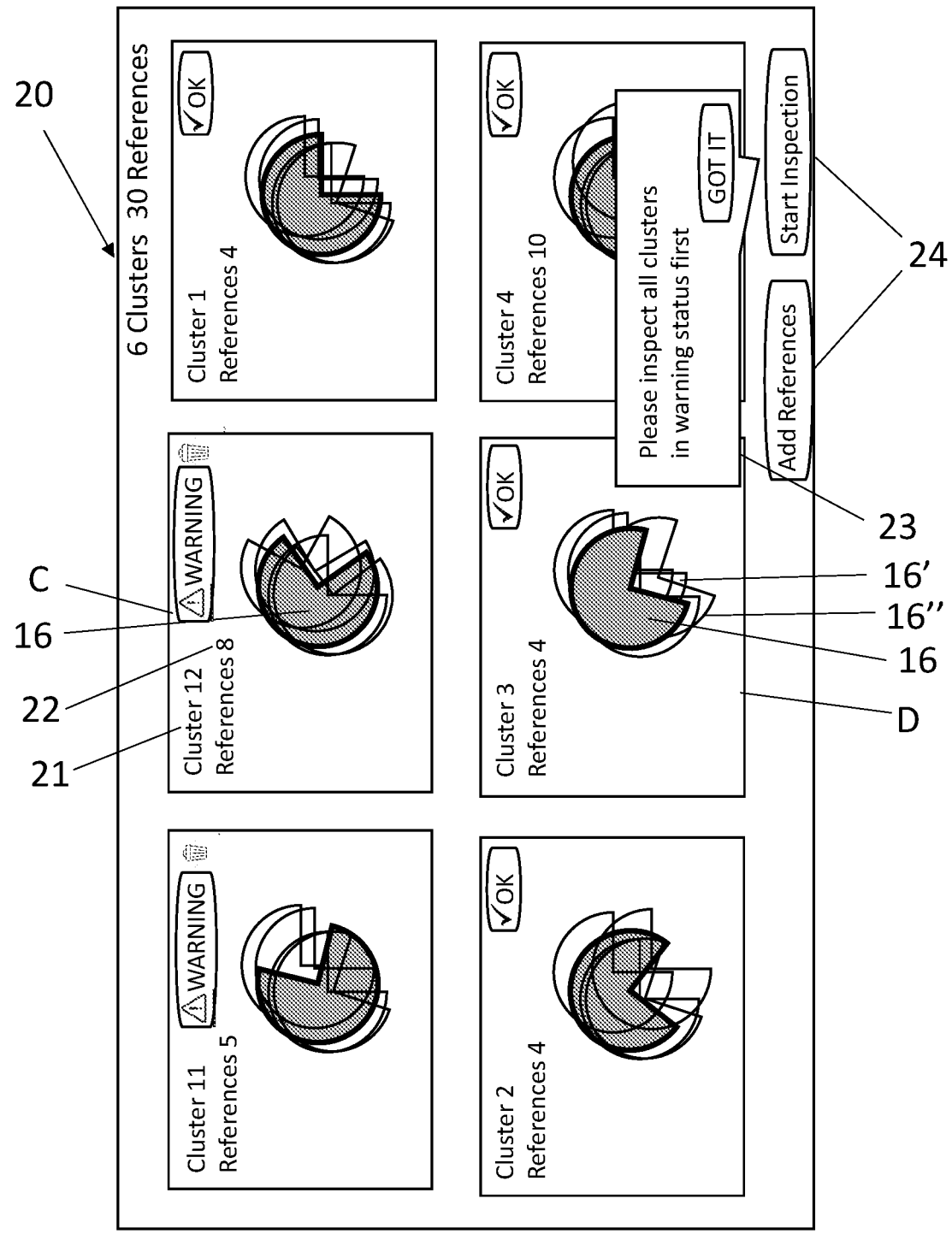
FIG. 1C schematically illustrates a user interface, according to an embodiment of the invention.

In some embodiments, one example of which is schematically illustrated in FIG. 1C, processor 102 may cause the clusters (e.g. images assigned to this cluster) or representations of the clusters to be displayed, e.g., via user interface device 106. A user may then provide input via the user interface device 106, to approve or disapprove each cluster. In some embodiments, a cluster ID 21, the number of images 22 included in the cluster and/or other information about the clusters, instructions to a user 23 and action buttons 24 may be displayed.

Each cluster may be represented by one or more representatives, for example, an average, median or other representing object from the cluster. Therefore, displaying the clusters to a user may include displaying a representative of each cluster.

In some embodiments each cluster is represented by an outline surrounding the object. An outline may be displayed on a display (e.g., a display of user interface device 106) as a line, e.g., a colored line, a broken line or other style of line, surrounding the object or as any other indication typically visible to a user.

For example, monitor 20 may display different clusters C and D by displaying one representative 16 of the object which portrays the cluster and optionally graphical marks 16' and 16", etc., showing positioning of all imaged objects. A user may thus better understand what each cluster includes in relation to all the imaged objects.

In some embodiments, upon a user request, individual images of a particular cluster may be displayed. For example, a user may click on a displayed representative of a cluster (e.g., representative 16) to open a new window or screen which displays individual images that were assigned to that cluster. Thus, a user interface according to embodiments of the invention, enables clusters to be approved or disapproved (e.g., deleted) as a whole, and/or individual images within a cluster to be approved and/or disapproved by a user.

If a cluster does not include enough images to ensure complete representation of an object (as further described herein and below), the cluster may be determined to be in an "incomplete" status, whereas a cluster including enough images is determined to be in "completed" status.

In some embodiments, a system for visual inspection includes a processor 102 in communication with a display (e.g., a monitor of user interface device 106), to receive an image of an object on an inspection line, detect the object in the image and assign the image to a cluster based on appearance of the object in the image (e.g., based on a spatial feature of the object in the image). Processor 102 may determine the status of the cluster and cause display of a representative of the cluster with an indication of the status of the cluster. The indication of the status of the cluster may include a visual characteristic that is different for each different status. For example, the visual characteristic may be color such that a representative of a completed cluster may be displayed in a different color than a representative of an incomplete cluster. In some embodiments, processor 102 causes an indication to appear in an image of an object (e.g., object 10 in images 11 or 12) in accordance with the cluster to which the object is assigned. Processor 102 may cause display of a first visual characteristic (e.g., color or other visual mark) when an object in the image is detected and a second visual characteristic to indicate the status of the cluster to which the object is assigned.

Figure 3A:
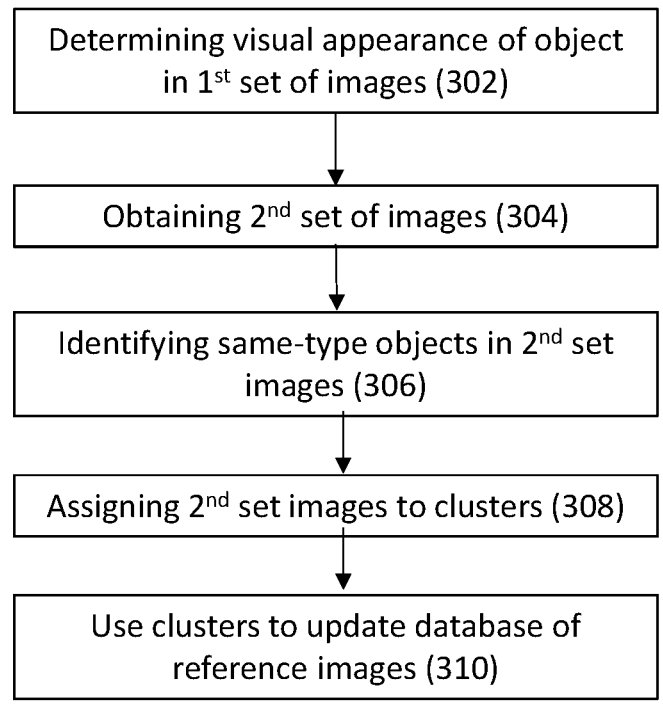
FIG. 3A is a schematic illustration of a method for a visual inspection line set-up process, according to an embodiment of the invention.

In one embodiment, which is schematically illustrated in FIG. 3A, a method for a visual inspection set-up process, may be performed by processor 102. The method includes determining a visual appearance of an object based a first set of images of the object (302). A second set of images of same-type objects is obtained (304) and the same-type objects are identified in the images of the second set based on analysis of the images of the first set (306). Each image from the second set is assigned to one (or more) of a plurality of clusters (308), based on a criterion, and the clusters (typically, image data of images assigned to the clusters) are used to update a database of reference images (310). The reference images from the updated database are then used in the inspection stage to enable defect detection and/or other inspection tasks.

Figure 3B:
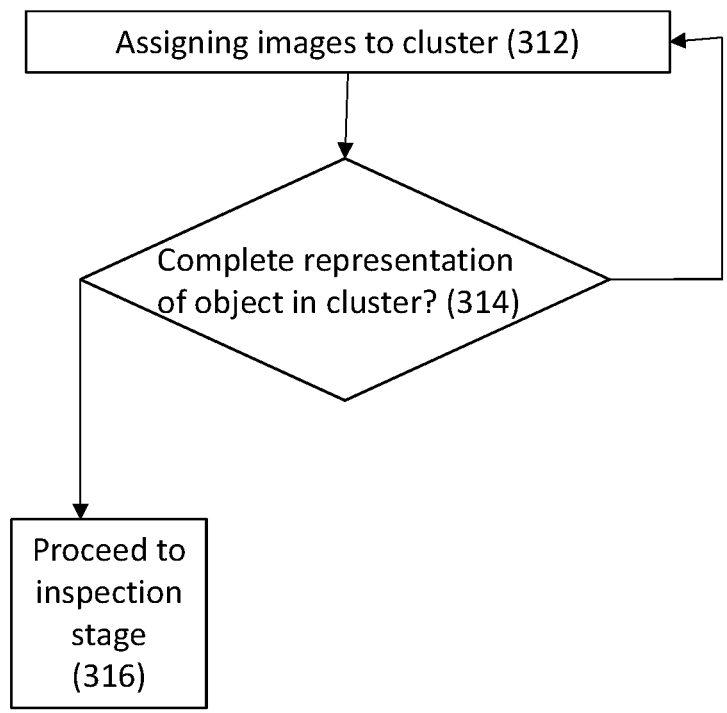
FIG. 3B is a schematic illustration of a method for proceeding from the set-up stage to the inspection stage, according to embodiments of the invention.

In another embodiment, which is schematically illustrated in FIG. 3B, images are assigned to a cluster, during a set-up stage, until the cluster includes enough reference images and has achieved optimization of imaging parameters, after which the process proceeds to the inspection stage.

As described above, enough reference images are collected once an essentially complete representation of the item is achieved. For example, a complete representation of the object is achieved when each new inspection image has a group of reference images in the cluster that can be used as a distortion-less reference to the inspection image and which are indicative of the tolerance and variations typical to the imaged item.

Thus, in one embodiment, a visual inspection method includes assigning images of an object to a cluster (312), typically based on appearance of the object in each image. For each cluster it is determined if a complete representation of the object has been achieved (314). If a complete representation of the object has been achieved, the cluster may proceed to the inspection stage (316). Namely, a successive image assigned to the cluster will be inspected for defects, e.g., by comparing the successive image to the images in the cluster.

If a complete representation of the object is not achieved (314) then a successive image that is assigned to the cluster (typically based on the appearance of the object in the successive image) is used as a reference image. Namely, the successive image is used to update a database of reference images and inspection algorithms (e.g., defect detection algorithms) are not applied to the successive image.

In some cases, during the inspection stage, an image may be obtained which is assigned to a cluster for which a complete representation of the object has not yet been achieved and therefore cannot be inspected for defects. In one embodiment, rather than wait for the cluster to achieve complete representation of the object, while holding up the inspection process, the image may be stored until enough images are assigned to the cluster to achieve complete representation of the object, while additional images that are assigned to completed clusters, may be inspected. Once enough images are assigned to the cluster, the cluster is completed. The completed cluster and/or images from the completed cluster may be displayed (e.g., via user interface device 106) for user confirmation. Once a cluster is completed, optionally after user approval, images may be compared to the completed cluster retroactively, to detect defects in images that were obtained prior to the completion of the cluster. Thus, defects may be detected retroactively in images assigned to the cluster.

In some embodiments determining if a complete representation of the object is achieved includes comparing images assigned to the cluster to each other. For example, determining if each image assigned to the cluster can be used as a distortion-less reference to all other images in the cluster, can be determined by comparing the images of the cluster to each other.

In some embodiments clusters include a predetermined number of images. The predetermined number may be specific to characteristics of an object (e.g., clusters for a 2D object may require less reference images than clusters for a 3D object, which for example can be defined by using depth-from-focus techniques). Thus, in one embodiment, determining if a complete representation of the object is achieved may include determining a number of images in the cluster. For example, if there is a predetermined number of images in a cluster it may be determined that a complete representation of the object has been achieved.

In one embodiment a visual inspection method includes assigning an image of an object to a cluster based on appearance of the object in the image. In one embodiment a status of the cluster (e.g., "completed" or "incomplete") is determined based on a determination if the cluster achieved a complete representation of the object or not. A processor then determines whether or not to apply an inspection algorithm on the image based on the status of the cluster. This enables to achieve inspection of some objects before all clusters achieved complete representation of the object.

Methods according to embodiments of the invention, e.g., as exemplified in FIGS. 3A and 3B, enable an improved visual inspection method in which some images may proceed to inspection, based on the cluster the images are assigned to, even before all the possible reference images for the object have been obtained, namely, before the set up stage is complete. This enables inspection to begin early and proceed with minimal interruption and with user involvement being concentrated to specific points during the process, thereby greatly streamlining the inspection process.

In some embodiments the clusters may be displayed to a user for approval prior to updating the database of reference images.

In one embodiment the first set of images includes only images of defect-free items, whereas the second set of images includes images that are not necessarily defect-free. Thus, images that are not necessarily defect-free can be used in a set-up stage, according to embodiments of the invention.

Figure 4:
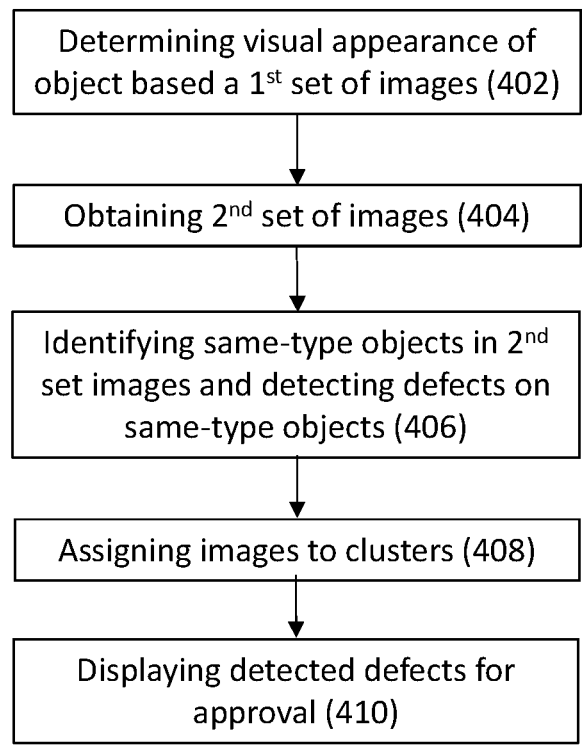
FIG. 4 is a schematic illustration of a method for a visual inspection line set-up process using images that are not necessarily defect-free, according to an embodiment of the invention.

In this embodiment, an example of which is schematically illustrated in FIG. 4, the second set of images may be analyzed for defects, based on the visual appearance of the object determined from the first set of images. In this example, a visual appearance of an object is determined based on a first set of images of defect-free objects (402).

A second set of images of same-type objects is obtained (404). The same-type objects in the second set may be defect-free or defected. The same-type objects are identified and defects may be detected on the same-type objects in the images of the second set based on the visual appearance detected in the first set (406). Each image from the second set is assigned to one or more of a plurality of clusters (408), based on a criterion and the clusters are used to update a database of reference images, as described above.

The defects detected in step (406) are then displayed to a user for approval (410). Optionally, the clusters can also be displayed to the user for approval.

A user may indicate, e.g., via user interface device 106, if the detected defects are indeed defects or are not considered to be defects. Processor 102 may then update the defect detection algorithms based on the user input. Thus, changes in images of the second set, which may or may not be defects, can be presented for user approval even if they are not changes that fall under a criterion of a cluster, and defect detection algorithms may be fine-tuned prior to beginning of the inspection stage, thereby further streamlining the visual inspection process.

Clusters may be created, e.g., by processor 102, based on predefined criteria and/or based on criteria detected from the images. In some embodiments a cluster threshold is determined, which is the threshold images are checked against, to determine which cluster they will be assigned to.

Figure 5:
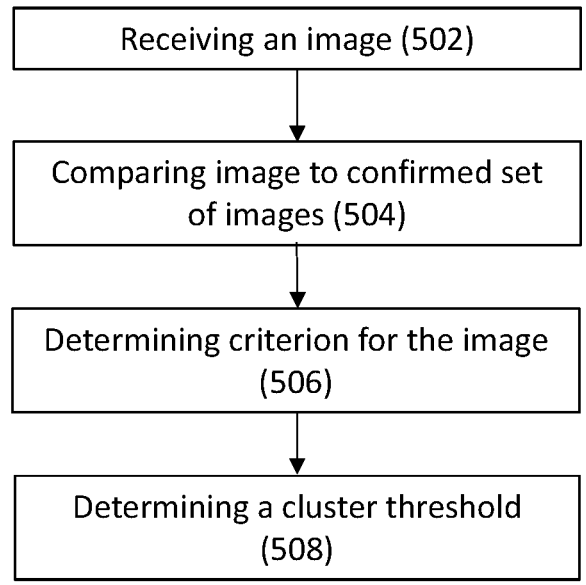
FIG. 5 is a schematic illustration of a method for determining a cluster threshold, according to embodiments of the invention.

For example, as schematically illustrated in FIG. 5, processor 102 may receive an image (reference or inspection image) (502) and compare the image to an existing set of confirmed images (504), typically, reference images. Based on the comparison, processor 102 can determine a criterion for the image (506). For example, if the object in the image is positioned at a rotation compared to the objects in the set of confirmed images, the criterion of "positioning" may be determined and/or the value of the criterion may be also determined (e.g., the angle of rotation compared to the objects in the set of confirmed images). Some examples, of differences between images, which may be used to determine a criterion, include, a changed angle or position in relation to the image frame (or camera FOV or point within the camera FOV), a rotation in one or more axis relative to the camera FOV, a change of scale relative to the camera FOV, change of shape and/or a different visual pattern on the object.

A cluster threshold may be determined based on the difference between the image and the confirmed set of images (508). Typically, the cluster threshold is determined based on the criterion and/or based on the value of the criterion. For example, a cluster threshold may include a value or range of values of angles, a size and/or shape of the object, a number or range of numbers of visual marks, a size or range of sizes of visual marks, a location or range of locations of visual marks within the object, a color or range of colors of visual marks, and so on.

A cluster threshold may include a range between two limits, e.g., a highest and lowest limit.

Thus, methods according to embodiments of the invention may include the steps of grouping a pre-determined number of images into a cluster wherein the threshold for the cluster is determined based on the pre-determined number.

In other embodiments the threshold is based on the criterion and on the object.

Thus, for example, same-type objects rotated in relation to the objects in the confirmed set of images, by an angle that is within a first range may define or may be assigned to a first cluster. Same-type objects having a pattern of red circles may define or may be assigned to a second cluster and same-type objects having a pattern of green circles may define or may be assigned to a third cluster, and so on.

In some embodiments a single image may be assigned to more than one cluster. For example, a first cluster threshold may include a first range of angles and a second cluster threshold may include a second range of angles, which partially overlaps with the first range. Images in which positioning of an object is at an angle that is within the overlap, may be assigned to both the first and second cluster. In another example a single image may be assigned to a first cluster based on a first criterion (e.g., positioning) and to a second cluster based on a second criterion (e.g., visible marking). Thus, inspection tasks, such as defect detection, for an image, may be performed based on comparison to one or more clusters.

In one embodiment, the method includes assigning a first image to a first cluster and assigning a second image to a second cluster if the difference between a value of the criterion in the first image and a value of the criterion in the second image is above a threshold.

Figure 6:
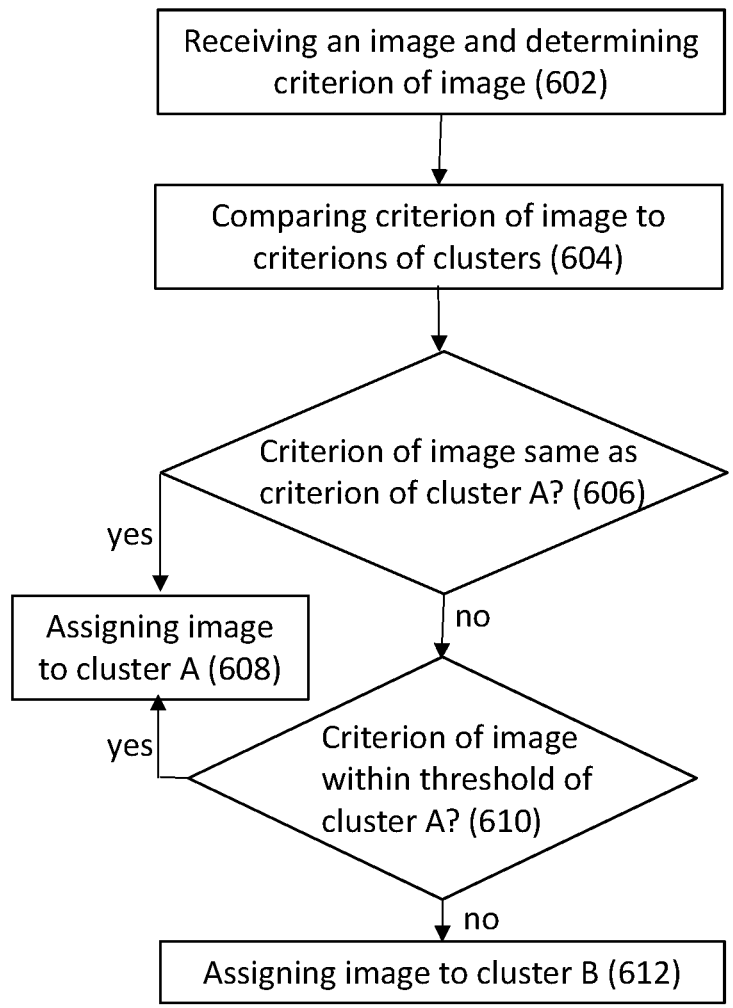
FIG. 6 is a schematic illustration of a method for clustering images, according to embodiments of the invention.

As schematically illustrated in FIG. 6, processor 102 may receive an image and determined the criterion (and/or value of criterion) of the image (e.g., as described in FIG. 5) (602). The criterion (and/or value) is compared to a criterion of a cluster, e.g., to a criterion (and/or value) of cluster A from the reference image database (604). If the criterion (and/or value) of the image is the same as the criterion (and/or value) of cluster A (606) the image is assigned to cluster A (608). If the criterion (and/or value) of the image is the not the same as the criterion (and/or value) of cluster A (606) then the criterion and/or value of the image is compared to the threshold of cluster A. If the criterion (and/or value) of the image is within (or above or below) the threshold of cluster A (610) then the image is assigned to cluster A (608). However, if the criterion (and/or value) of the image is the not within (or above or below) the threshold of cluster A (610), then the image is assigned to another cluster (e.g., cluster B) (612), for example, if the criterion and its' value are compatible with the threshold of cluster B.

A criterion and/or threshold of cluster may be pre-determined or dynamic, e.g., dependent on the specific type of object being inspected.

Figure 7A:
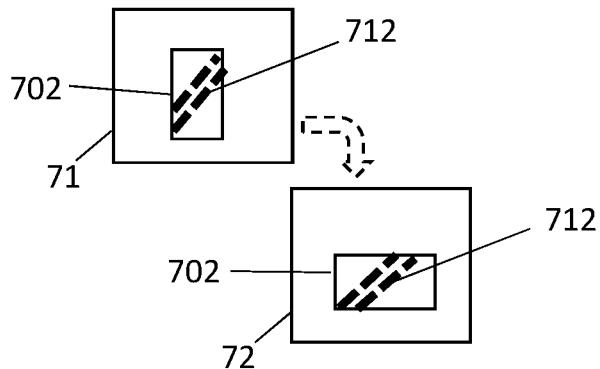
FIG. 7A schematically illustrates clustering of a 2D object, according to embodiments of the invention.

In the example, which is schematically illustrated in FIG. 7A, a two dimensional object 702 having a pattern 712 on it, is shown in two images, 71 and 72. The object 702 is rotated by 90° in image 72 compared with image 71(as illustrated by the dashed arrow), however, the pattern 712 is visible in both images 71 and 72. Thus, images 71 and 72 may conceivably be assigned to a single cluster, which is defined by a broad range of visible patterns on the object.

Figure 7B:
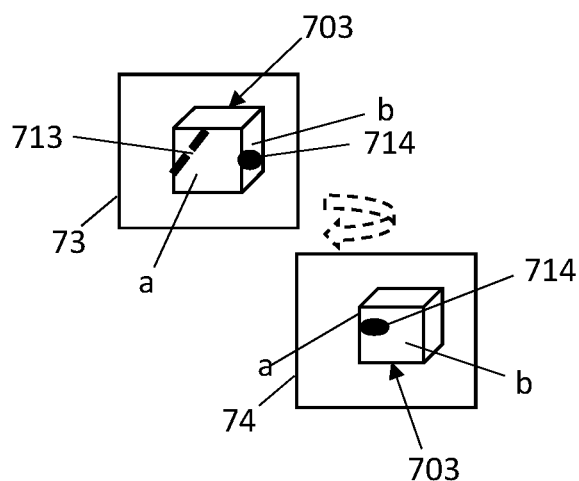
FIG. 7B schematically illustrates clustering of a 3D object, according to embodiments of the invention.

In the example, which is schematically illustrated in FIG. 7B, object 703 is a three dimensional object having pattern 713 on a first surface (a) of the object and pattern 714 on a second surface (b) of the object, as visible in image 73. The object 703 in image 74 is rotated along its longitudinal axis by 90° compared to object 703 in image 73 (as illustrated by the dashed arrow). In this case, the rotation causes the first surface (a) of object 703 to be occluded while the second surface (b) stays visible. Consequently, pattern 714 is visible but pattern 713 is not visible in image 74. Since different patterns are visible in images 73 and 74, these images would not be assigned to the same cluster.

In one example, a pre-determined number of images (e.g., twenty) may be grouped into a cluster. In other cases, the number of images within a cluster is not pre-determined but rather dependent on the specific type of object being inspected. For example, a cluster may include enough images to enable determining the spatial range in which each reference image can be used as a distortion-less reference, as described above.

In one example, an outline may be created around an object (possibly an average or other representing object) and the outline is used as a cluster threshold. For example, all images in which objects fit within the outline, may be assigned to the same cluster. An outline representing a 2D object may loosely follow the contour of the object, whereas the outline representing a 3D object, will typically more closely follow the contour of the object.

Embodiments of the invention enable to create, with minimal user involvement, a broad database of reference images to improve performance of inspection tasks.

The invention claimed is:

1. A visual inspection method of a manufacturing plant, the method comprising:
   detecting an object in a plurality of set-up images of an inspection line of the manufacturing plant, in each set-up image the object conforming to a criterion;
   grouping the images into a plurality of separate clusters based on values of the criterion;
   detecting the object in an inspection image of the inspection line;
   comparing the inspection image to a cluster of the plurality of separate clusters based on a value of the criterion of the object in the inspection image; and
   operating the manufacturing plant and detecting a defect on the object in the inspection image during operation of the manufacturing plant based on the comparison to increase a speed of visual inspections during production processes; and
   determining that each image assigned to the cluster of the plurality of separate clusters does not show perspective distortion compared to all other images assigned to the cluster, prior to comparing the inspection image to the cluster of the plurality of separate clusters.

2. The method of claim 1, wherein grouping the images into the plurality of separate clusters based on values of the criterion comprises assigning a first image to a first cluster and assigning a second image to a second cluster if a difference between a value of the criterion in the first image and a value of the criterion in the second image is above a threshold.

3. The method of claim 2, wherein the threshold is based on the criterion and on the object.

4. The method of claim 1, wherein the set-up images comprise images of defect-free objects and the inspection image comprises either a defect-free or defected object.

5. The method of claim 1, further comprising:
   determining whether a cluster of the plurality of separate clusters achieved a complete representation of the object, and if a complete representation of the object is achieved then detecting a defect on the object in the inspection image.

6. The method of claim 5, wherein determining whether the cluster of the plurality of separate clusters achieved a complete representation of the object comprises determining a number of images in the cluster.

7. The method of claim 5, wherein determining whether the cluster of the plurality of separate clusters achieved a complete representation of the object comprises comparing images assigned to the cluster to each other.

8. The method of claim 7, wherein determining whether the cluster of the plurality of separate clusters achieved a complete representation of the object comprises determining whether each image assigned to the cluster can be used as a distortion-less reference to all other images assigned to the cluster.

9. The method of claim 1, wherein if a complete representation of the object is not achieved, then the method comprises utilizing a successive image assigned to the cluster of the plurality of separate clusters to update a database of reference images.

10. The method of claim 1, further comprising:
    displaying the cluster of the plurality of separate clusters to a user for approval.

11. The method of claim 1, further comprising:
    retroactively detecting defects in images assigned to a cluster of the plurality of separate clusters.

12. A system for visual inspection in a manufacturing plant, the system comprising:
    a processor in communication with a display, the processor being configured to;
      receive an image of an object on an inspection line of the manufacturing plant,
      detect the object in the image,
      assign the image to a cluster of a plurality of separate clusters based on appearance of the object in the image,
      determine a status of the cluster of the plurality of separate clusters, based on a determination that the cluster achieved a complete representation of the object,
      determine that an inspection algorithm should be applied on the image based on the status of the cluster, thereby achieving inspection of some objects before all clusters achieved complete representation of the object; and
      determine that each image assigned to the cluster of the plurality of separate clusters does not show perspective distortion compared to all other images assigned to the cluster, prior to comparing the image to the cluster of the plurality of separate clusters;
    wherein the manufacturing plant is operated and a defect on the object in the image is detected during operation of the manufacturing plant based on a comparison to increase a speed of visual inspections during production processes.

13. The system of claim 12, wherein the processor is further configured to determine when the cluster of the plurality of separate clusters achieved a complete representation of the object by determining when each image assigned to the cluster of the plurality of separate clusters can be used as a distortion-less reference to all other images assigned to the cluster.

* * * * *